(12) United States Patent
Kim

(10) Patent No.: US 11,318,436 B2
(45) Date of Patent: May 3, 2022

(54) HYDROGEN REFORMER USING EXHAUST GAS

(71) Applicant: AMOGREENTECH CO., LTD., Gimpo-si (KR)

(72) Inventor: Myoung Soo Kim, Seoul (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 240 days.

(21) Appl. No.: 16/486,023

(22) PCT Filed: Mar. 2, 2018

(86) PCT No.: PCT/KR2018/002522
§ 371 (c)(1),
(2) Date: Aug. 14, 2019

(87) PCT Pub. No.: WO2018/164418
PCT Pub. Date: Sep. 13, 2018

(65) Prior Publication Data
US 2020/0047145 A1     Feb. 13, 2020

(30) Foreign Application Priority Data

Mar. 7, 2017  (KR) .......................... 10-2017-0028813

(51) Int. Cl.
*B01J 15/00*     (2006.01)
*B01D 53/94*    (2006.01)
(Continued)

(52) U.S. Cl.
CPC .......... *B01J 15/005* (2013.01); *B01D 53/343* (2013.01); *B01D 53/94* (2013.01); *B01J 19/0013* (2013.01);
(Continued)

(58) Field of Classification Search
CPC ..... Y02T 10/12; F01N 2240/30; F02M 27/02; B01J 15/005; B01J 19/249
See application file for complete search history.

(56) References Cited

U.S. PATENT DOCUMENTS 3,930,476 A * 1/1976 Koch .................... F02M 27/02
123/545
4,003,343 A * 1/1977 Lee ........................ F02M 27/02
48/212
(Continued)

FOREIGN PATENT DOCUMENTS

JP     2001164932    6/2001
JP     2007155291    6/2007
(Continued)

OTHER PUBLICATIONS

Formal translation of JP 2008-031931 A1 (Year: 2008).*
International Search Report—PCT/KR2018/002522 dated May 28, 2018.

*Primary Examiner* — Imran Akram
(74) *Attorney, Agent, or Firm* — Cantor Colburn LLP

(57) ABSTRACT

Provided is a hydrogen reformer using exhaust gas, comprising: a catalytic reaction unit which generates a reforming gas containing hydrogen when exhaust gas generated in an engine and fuel are supplied thereto; and a heat exchange chamber which is mounted on an outer surface of the catalytic reaction unit and exchanges heat between the exhaust gas and the catalytic reaction unit to supply heat that is required for an endothermic reaction of the catalytic reaction unit, wherein heat of the exhaust gas is used for the endothermic reaction of a catalyst, such that a separate heat source for the endothermic reaction is unnecessary.

3 Claims, 6 Drawing Sheets

(51) Int. Cl.
*B01D 53/34* (2006.01)
*B01J 19/00* (2006.01)
*B01J 19/24* (2006.01)
*C01B 3/02* (2006.01)
*F01N 3/10* (2006.01)

(52) U.S. Cl.
CPC ............... *B01J 19/249* (2013.01); *C01B 3/02* (2013.01); *F01N 3/10* (2013.01)

(56) References Cited

U.S. PATENT DOCUMENTS

| | | | | |
|---|---|---|---|---|
| 5,943,859 A | * | 8/1999 | Kawamura | F02M 27/02 60/303 |
| 2003/0202919 A1 | * | 10/2003 | Bruck | F01N 3/2006 422/181 |
| 2004/0050035 A1 | * | 3/2004 | Smaling | F01N 3/0871 123/301 |
| 2004/0098977 A1 | * | 5/2004 | Kupe | F01N 3/035 60/297 |
| 2004/0103660 A1 | * | 6/2004 | Kawamura | F28F 13/18 60/599 |
| 2005/0274104 A1 | * | 12/2005 | Bromberg | F01N 13/017 60/275 |
| 2006/0037244 A1 | * | 2/2006 | Clawson | C01B 3/503 48/198.1 |
| 2006/0144349 A1 | * | 7/2006 | Mirji | F02M 25/12 123/3 |
| 2006/0168950 A1 | * | 8/2006 | Taylor, III | F02M 25/12 60/297 |
| 2007/0056268 A1 | * | 3/2007 | McCarthy | F01N 13/04 60/301 |
| 2009/0071420 A1 | * | 3/2009 | Huber | C01B 3/34 123/3 |
| 2009/0293454 A1 | * | 12/2009 | Shimoda | F01N 3/0842 60/297 |
| 2009/0320455 A1 | * | 12/2009 | Fresnet | F01N 9/002 60/297 |
| 2011/0179715 A1 | * | 7/2011 | Penman | F02D 19/0642 48/197 R |
| 2013/0216473 A1 | * | 8/2013 | Nicole | F01N 3/2053 423/651 |

FOREIGN PATENT DOCUMENTS

| | | |
|---|---|---|
| JP | 2008031931 | 2/2008 |
| KR | 20080060871 | 7/2008 |
| KR | 101190233 | 10/2012 |
| KR | 20120117426 | 10/2012 |

\* cited by examiner

HYDROGEN REFORMER USING EXHAUST GAS

TECHNICAL FIELD

The present disclosure relates to a hydrogen reformer using exhaust gas in which hydrogen is produced by using the exhaust gas and the produced hydrogen is supplied to an engine.

BACKGROUND ART

Due to the limits of the current hydrogen fuel technology such as fuel cells, it is the tendency to create a hydrogen-related industry through the development and utilization of the technology of using a mixture of hydrogen and fossil fuels, in parallel to develop the technology of core parts including generators of reformed gas containing hydrogen.

Hydrogen, which is a main component of reformed gas, has a very ideal characteristic as an engine fuel because it has a faster combustion reaction and diffusion rate than conventional fossil fuels, and makes clean combustion without smoke. Therefore, by using syngas mixed with existing fossil fuels, the thermal efficiency of the engine can be improved and the exhaust gas can be remarkably reduced.

As disclosed in Korean Patent Registration Publication No. 10-1190233 (published on Oct. 12, 2012), an engine system having an existing reforming reaction unit includes: a reformer having a first reforming reaction unit into which fuel and air are introduced and the fuel is burned to generate a heat source, and a second reforming reaction unit connected to the first reforming reaction unit and a reforming catalytic reactor on the surface of which a reforming catalyst is coated, and which reforms reaction of steam, unreacted fuel, and air generated in and introduced from the first reforming reaction unit; and a heat exchanger installed between the reformer and an engine for exchanging heat between reformed gas discharged from the reformer and air introduced into the reformer.

In such an engine system, the reformed gas discharged from the reformer and the air introduced into the reformer are heat-exchanged with each other and the heat exchanged between the reformed gas and the air is used as a heat source necessary for a catalytic action.

However, a separate heat source for heating air supplied to the heat exchanger is required, to thereby cause the complicated construction, and to result in the poor heat exchange performance in the case of a general heat exchanger.

DISCLOSURE

Technical Problem

It is an object of the present disclosure to provide a hydrogen reformer using exhaust gas in which heat of the exhaust gas is used as a heat source necessary for an endothermic reaction of a catalyst, and a separate heat source for the endothermic reaction is unnecessary.

It is another object of the present disclosure to provide a hydrogen reformer using exhaust gas capable of improving heat exchange performance between a catalyst and the exhaust gas to improve efficiency of the reformer.

Technical Solution

According to one aspect of the present disclosure, there is provided a hydrogen reformer which is configured such that exhaust gas generated in an engine and fuel are supplied to a catalytic reaction unit to produce a reformed gas containing hydrogen, and when the exhaust gas is supplied to a heat exchange chamber mounted on an outer surface of the catalytic reaction unit, the exhaust gas and the catalytic reaction unit are heat-exchanged with each other to provide heat necessary for an endothermic reaction of the catalytic reaction unit.

The catalyst reaction unit may include: a housing having an inlet and an outlet in which the exhaust gas and the fuel are supplied into the housing through the inlet and a reformed gas containing hydrogen produced after the catalytic reaction is discharged through the outlet out of the housing; and a metal catalyst carrier mounted in the housing to react with the exhaust gas and the fuel thereby producing the reformed gas.

The inlet may be connected, via a first line, to an exhaust pipe through which the exhaust gas generated in the engine is exhausted and may be connected, via a second line, to a fuel supply line for supplying the fuel to the engine, and the outlet may be connected, via a third line, to the fuel supply line for supplying the fuel to the engine.

The metal catalyst carrier may include a passage through which a mixed gas of the exhaust gas and the fuel passes in which the passage is formed of flat plates and corrugated plates which are alternately arranged, and a catalytic material may be coated on the surfaces of the flat plates and the corrugated plates such that the catalytic material reacts with the mixed gas to produce a reformed gas containing hydrogen.

The heat exchange chamber may be mounted on an outer surface of the housing to form a space through which the exhaust gas passes. A gas inlet port through which exhaust gas flow may be formed at one side of the heat exchange chamber, and a gas outlet port through which the exhaust gas is discharged after completion of heat exchange may be formed at the other side thereof.

A heat exchange unit may be provided in the heat exchange chamber to increase a heat exchange area between the exhaust gas and the catalytic reaction unit and extend the time for which the exhaust gas stay to improve the heat exchange performance.

The heat exchange unit may be formed of a heat exchange plate mounted so as to be wound on the outer surface of the housing at certain intervals to thus partition the inside of the heat exchange chamber into a plurality of spaces and allow the exhaust gas to pass through the outer surface of the housing while being rotated around the outer surface of the housing.

The heat exchange unit may be formed of a honeycomb member mounted on the outer surface of the housing and having a plurality of passages through which the exhaust gas passes in the longitudinal direction of the housing.

The heat exchange unit may be a honeycomb member having a plurality of passages through which exhaust gas passes in the longitudinal direction of the housing. The honeycomb member may be divided into a plurality of portions in the longitudinal direction of the housing, and a distribution space may be formed between the plurality of portions of the honeycomb member such that the exhaust gas is uniformly distributed in a plurality of passages.

A plurality of heat exchange fins may be mounted so as to protrude in a direction perpendicular to the outer surface of the housing of the heat exchange unit.

Advantageous Effects

As described above, in the present disclosure, the heat exchange chamber through which the exhaust gas is supplied is provided on the outer surface of the housing such that heat of the exhaust gas can be used for the endothermic reaction of the catalytic reaction unit, thereby simplifying the structure and reducing the costs.

In addition, the heat exchange unit capable of improving the heat exchange performance is provided in the heat exchange chamber to improve the heat exchange performance between the exhaust gas and the catalyst reaction unit and improve the efficiency of the reformer.

BEST MODE

Figure 1:
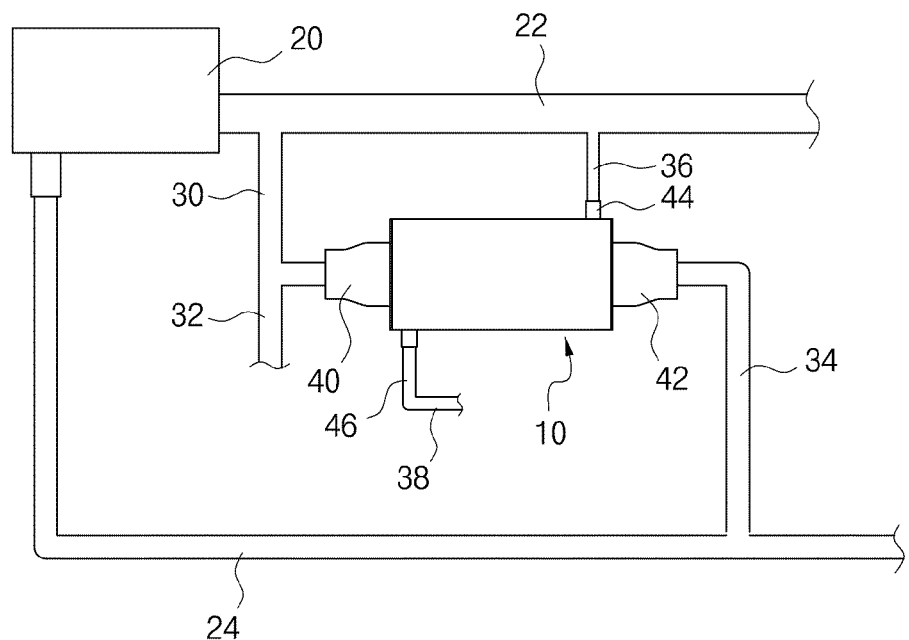
FIG. 1 is a configuration diagram of an engine system equipped with a hydrogen reformer according to an embodiment of the present disclosure.

Hereinafter, embodiments of the present disclosure will be described in detail with reference to the accompanying drawings. The sizes and shapes of the components shown in the drawings may be exaggerated for clarity and convenience. In addition, terms defined in consideration of the configuration and operation of the present disclosure may vary depending on the intention or custom of the user, the operator, and the like. Definitions of these terms should be based on the content of this specification.

Figure 2:
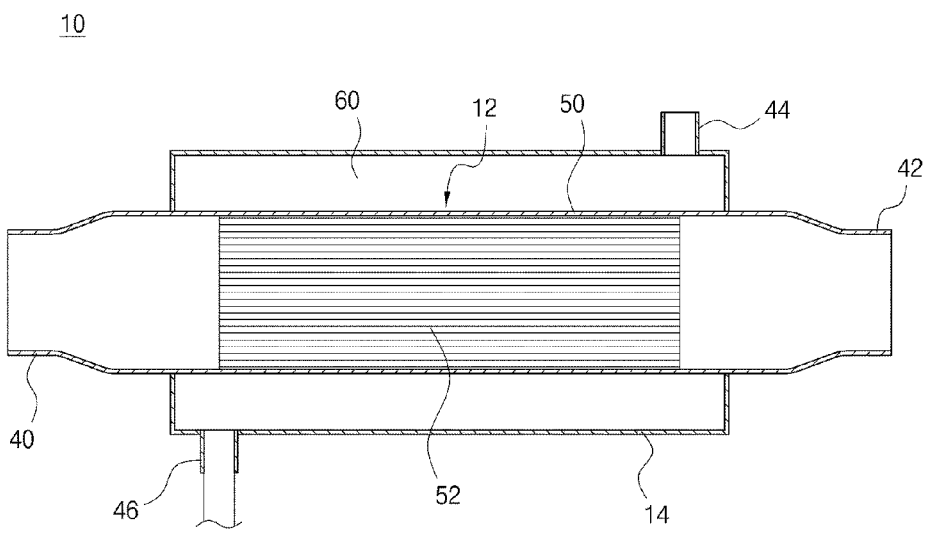
FIG. 2 is a crosswise cross-sectional view of a hydrogen reformer according to a first embodiment of the present disclosure.

Referring to FIGS. 1 and 2, a hydrogen reformer 10 according to an embodiment of the present disclosure includes: a catalytic reaction unit 12 for producing a reformed gas containing hydrogen when exhaust gas generated from an engine 20 and fuel are supplied to the catalytic reaction unit 12; and a heat exchange chamber 14 mounted on an outer surface of the catalytic reaction unit 12 to provide heat necessary for an endothermic reaction of the catalytic reaction unit 12 by using heat of the exhaust gas discharged from the engine 20.

The catalyst reaction unit 12 includes: a housing 50 having an inlet 40 and an outlet 42 in which the exhaust gas and the fuel are supplied into the housing 50 through the inlet 40 and a reformed gas containing hydrogen produced after the catalytic reaction is discharged through the outlet 42 out of the housing 50; and a metal catalyst carrier 52 mounted in the housing 50 to react with the exhaust gas and the fuel thereby producing the reformed gas.

Here, the housing 50 is formed in a cylindrical or polygonal shape, and the inlet 40 is connected, via a first line 30, to an exhaust pipe 22 through which the exhaust gas generated in the engine 20 is discharged, and thus a part of the exhaust gas is supplied into the housing 50 through the first line 30. In addition, the inlet 40 is connected to the second line 32 through which the fuel is supplied into the housing 50 so that a small amount of fuel is supplied into the housing 50 through the second line 32.

Here, the liquid-type fuel supplied through the second line 32 is atomized by a fuel injection device or the like, and the atomized fuel and the exhaust gas are mixed and supplied into the housing 50 through the inlet 40.

Here, the mixing ratio of the exhaust gas and the fuel can be appropriately adjusted through various tests, and the first line 30 and the second line 32 may be equipped with regulating valves for regulating the supply amount of the exhaust gas and the supply amount of the fuel, respectively.

The outlet 42 of the housing 50 is connected, via a third line 34, to a fuel supply line 24 for supplying fuel to the engine 20 to thus supply the engine with a mixed gas of the fuel and the reformed gas containing hydrogen.

In the case of an engine using fossil fuel, when the fuel containing hydrogen is supplied to the engine, the combustion reaction and diffusion speed in the combustion chamber is fast, and the combustion is clean without soot, and thus the thermal efficiency can be improved while reducing harmful exhaust gas.

The engine may be a gasoline engine, a diesel engine, an LPG engine, or the like, preferably a gasoline engine, and the fuel supplied to the hydrogen reformer may be gasoline.

Figure 3:
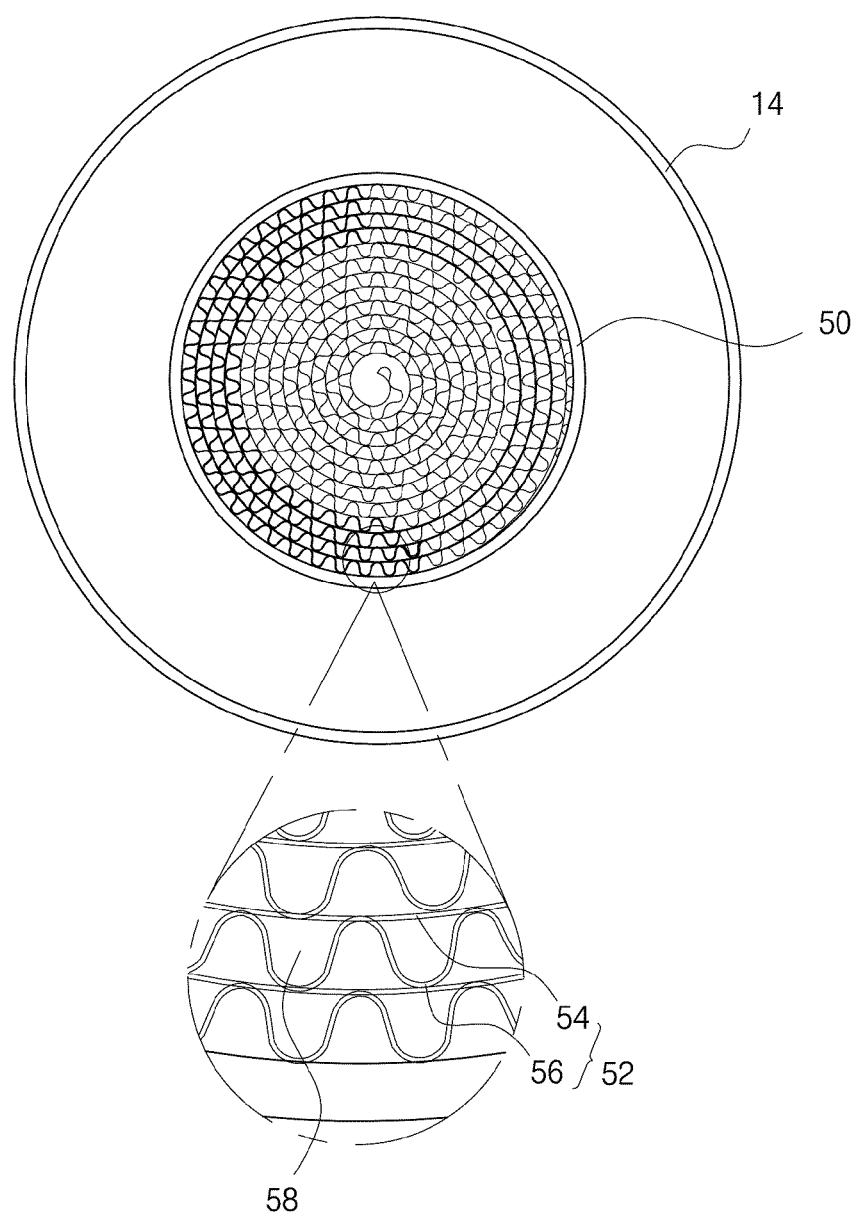
FIG. 3 is a lengthwise cross-sectional view of the hydrogen reformer according to the first embodiment of the present disclosure.

As shown in FIG. 3, the metal catalyst carrier 52 has flat plates 54 and corrugated plates 56 which are alternately arranged. The metal catalyst carrier 52 in which the flat plates 54 and the corrugated plates 56 are alternately arranged is disposed in the housing 50 in a rolled form when the housing 50 is circular depending on the shape of the housing 50.

Meanwhile, when the housing 50 has a rectangular shape, a plurality of flat plates 54 and flat plates 56 may be stacked and disposed inside the housing 50.

The flat plates 54 and the corrugated plates 56 are formed of a heat-resistant thin metal plate, and have the thickness of preferably 20 μm to 100 μm.

The corrugated plates 56 are formed in a wavy shape or a concavo-convex shape, and the flat plates 54 are formed in a flat plate shape. When the corrugated plates 56 and the flat plates 54 are alternately stacked in the housing 50, passages 58 through which a mixed gas of the exhaust gas and fuel passes are formed. The surfaces of the flat plates 54 and the corrugated plates 56 are coated with a catalyst material which reacts with the mixed gas to produce hydrogen.

The heat exchange chamber 14 is mounted on the outer surface of the housing 50 and is provided with a space 60 in which the exhaust gas remains. A gas inlet 44 connected to the exhaust pipe 22 via a fourth line 36 for sucking exhaust gas is formed at one side of the heat exchange chamber 14. A gas outlet 46 through which the exhaust gas sucked into the gas inlet 44 is transferred from one side of the heat exchange chamber 14 to the other side thereof and the heat exchange between the exhaust gas and the catalytic reaction unit 12 is performed to then discharge the exhaust gas which has been completely heat-exchanged.

In the fourth line 36, a regulating valve capable of regulating the amount of exhaust gas to be supplied to the heat exchange chamber 14 may be provided.

The heat exchange chamber 14 is formed in a closed form on the outer surface of the housing 50 and is provided with a space 60 through which the exhaust gas passes. The heat exchange chamber 14 may be equipped with a heat insulating material on the outer surface of the heat exchange chamber 14 to prevent the heat of the exhaust gas passing through the space 60 from being discharged to the outside by insulating the heat exchange chamber 14. Meanwhile, the heat exchange chamber 14 can be formed of a material having heat insulating performance.

The gas outlet 46 is connected to a fifth line 38, and the fifth line 38 is connected to an exhaust port for exhausting the exhaust gas to the outside.

In the case of the hydrogen reformer, a heat source is required for the endothermic reaction of the metal catalyst carrier 52. When an electric heater is used as a heat source, electricity generated from a generator of an engine or a battery may be used. However, since the currently available vehicles are digitized and electronicized, various electronic devices that use electricity are increasingly required therein, and electric consumption of the vehicles is getting worsened by such electronic devices.

The hydrogen reformer according to the present embodiment can utilize the exhaust heat generated in the engine for the endothermic reaction of the catalytic reaction unit 12, so that a separate heater is unnecessary and the electric consumption of the vehicle can be reduced.

Figure 4:
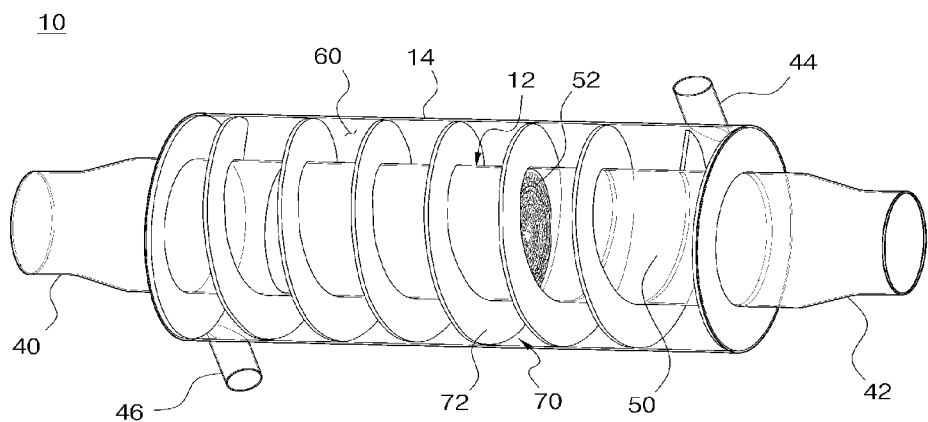
FIG. 4 is a perspective view of a hydrogen reformer according to a second embodiment of the present disclosure.
Figure 5:
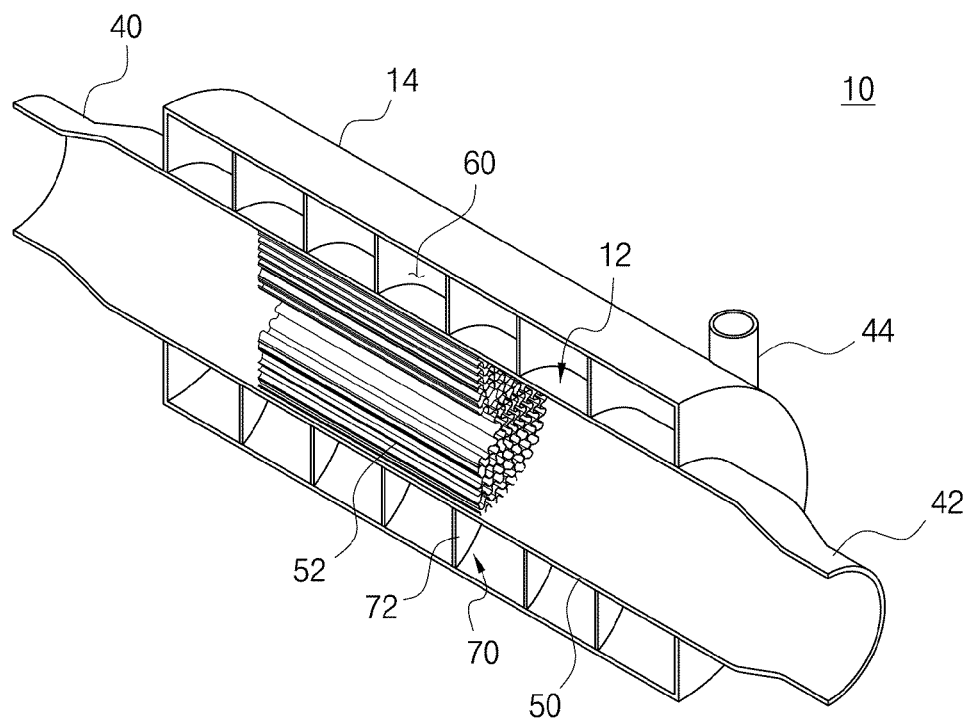
FIG. 5 is a perspective cross-sectional view of the hydrogen reformer according to the second embodiment of the present disclosure.

As shown in FIGS. 4 and 5, a hydrogen reformer according to a second embodiment, includes: a catalytic reaction unit 12 for producing a reformed gas containing hydrogen when exhaust gas generated from an engine and fuel are supplied to the catalytic reaction unit 12; a heat exchange chamber 14 in which a space 60 through which exhaust gas passes is formed to supply heat required for an endothermic reaction in the catalytic reaction section 12 using exhaust heat; and a heat exchange unit 70 provided inside the heat exchange chamber 14 to improve the heat exchange performance between the exhaust gas and the catalytic reaction unit 12.

The heat exchange unit 70 is installed between the inner surface of the heat exchange chamber 14 and the outer surface of a housing 50 and includes a spiral type heat exchange plate 72, to increase the time for the exhaust gas to stay in the space 60 and to increase a heat exchange area to improve the heat exchange performance.

The heat exchange plate 72 is formed in a spirally wound shape with a predetermined interval on the outer surface of the housing 50. The inside of the heat exchange chamber 14 is divided into a plurality of sub-spaces, and the exhaust gas is moved while being rotated along the heat exchange plate 72. Therefore, the time for which the exhaust gas stays in the heat exchange chamber 14 is increased and the heat exchange area is increased.

The heat exchange plate 72 is made of a metal material having excellent heat transfer performance.

Therefore, the hydrogen reformer according to the second embodiment improves the heat exchange performance between the exhaust gas and the catalytic reaction unit 12 by the heat exchange plate 72, thereby improving the reforming performance of the catalytic reaction unit 12.

Figure 6:
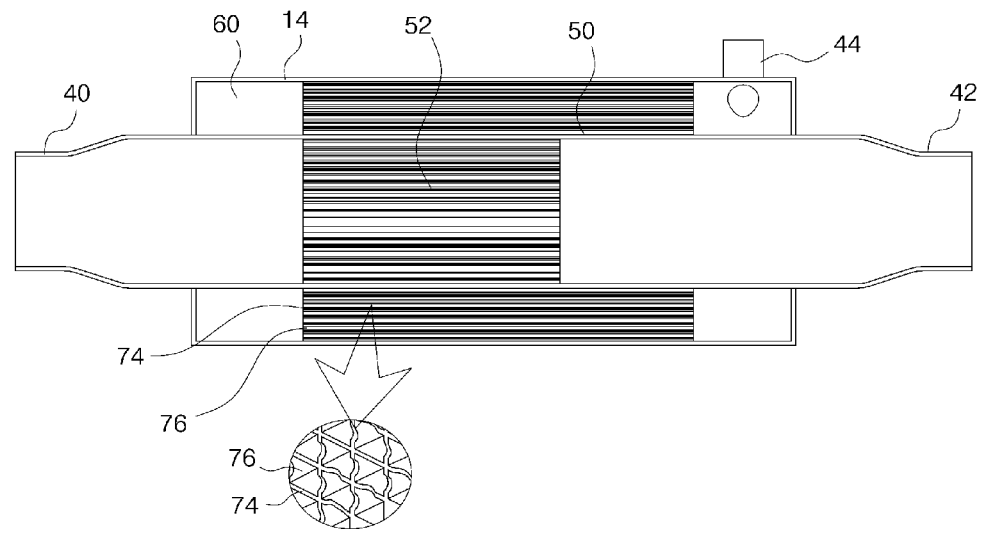
FIG. 6 is a cross-sectional view of a hydrogen reformer according to a third embodiment of the present disclosure.

As shown in FIG. 6, a hydrogen reformer according to a third embodiment, includes a honeycomb member 74 having a plurality of passages 76 and used as a heat exchange unit 70 (see FIGS. 4 and 5) provided inside the heat exchange chamber 14 to improve heat exchange performance.

The honeycomb member 74 has the plurality of passages 76 formed along the longitudinal direction in the heat exchange chamber 14 so that the exhaust gas passes through the plurality of passages 76 to maximize the heat exchange area.

As the honeycomb member 74, a structure in which the flat plates 54 and the corrugated plates 56 of the metal catalyst carrier 52 described above are alternately stacked can be applied.

Figure 7:
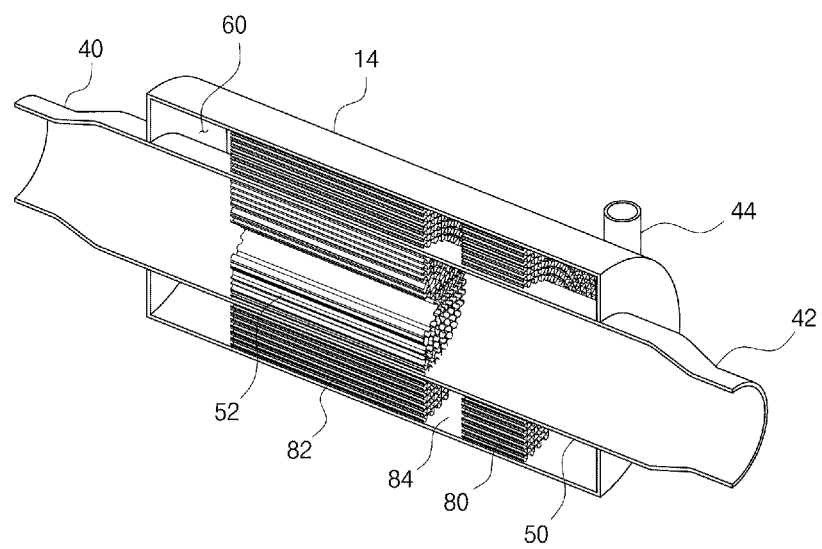
FIG. 7 is a perspective cross-sectional view of a hydrogen reformer according to a fourth embodiment of the present disclosure.

As shown in FIG. 7, a hydrogen reformer according to a fourth embodiment, includes honeycomb members 80 and 82 having a plurality of passages 76 (see FIG. 6) and used as a heat exchange unit 70 (see FIGS. 4 and 5) provided inside the heat exchange chamber 14 to improve heat exchange performance. The honeycomb members 80 and 82 are divided into a plurality of portions along the longitudinal direction of the heat exchange chamber 14 in which a distribution space 84 through which the exhaust gas is distributed is formed between the honeycomb members 80 and 82 divided into the plurality of portions.

That is, the heat exchange unit 70 according to the fourth embodiment includes: the first honeycomb member 80 through which the exhaust gas sucked into a gas inlet 44 passes primarily; the distribution spaces 84 through which the exhaust gas passed through the first honeycomb member 80 is distributed to be uniformly distributed into the plurality of passages 76; and the second honeycomb member 82 through which the exhaust gas distributed from the distribution space 84 passes secondarily.

As described above, the heat exchange unit according to the fourth embodiment includes the distribution space 84 between the honeycomb members 80 and 82, so that the exhaust gas can uniformly pass through the plurality of passages 76 formed in the honeycomb members 80 and 82 to thereby further improve the heat exchange performance.

Figure 8:
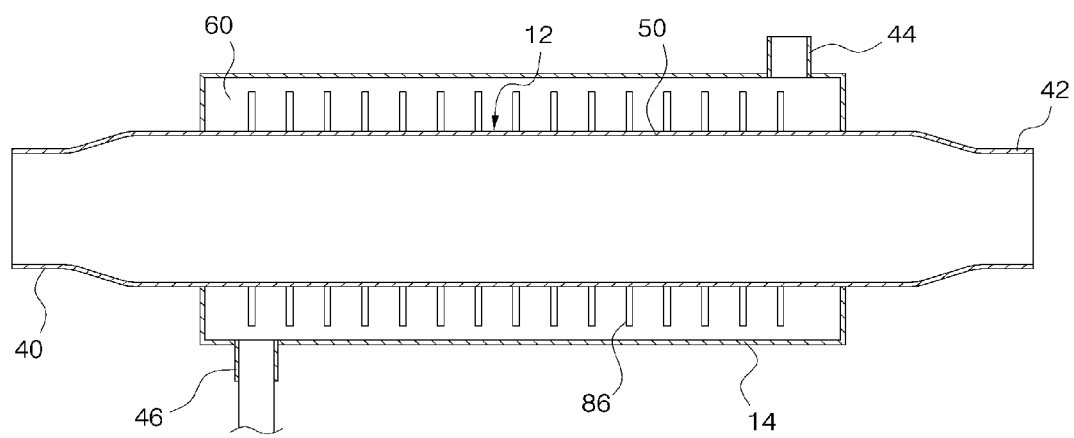
FIG. 8 is a cross-sectional view of a hydrogen reformer according to a fifth embodiment of the present disclosure.

As shown in FIG. 8, a hydrogen reformer according to a fifth embodiment, includes a plurality of heat exchange fins 86 installed inside the heat exchange chamber 14 and mounted on the outer surface of the housing 50 to thus be used as a heat exchange unit for improving the heat exchange performance.

That is, the plurality of heat exchange fins 86 are formed so as to protrude from the outer surface of the housing 50 in a direction perpendicular to the outer surface of the housing 50 to exchange heat of the exhaust gas with the heat exchange fins 86 while the exhaust gas passes through the housing 50 to thereby expand the heat exchange area and thus improve the heat exchange performance.

Figure 9:
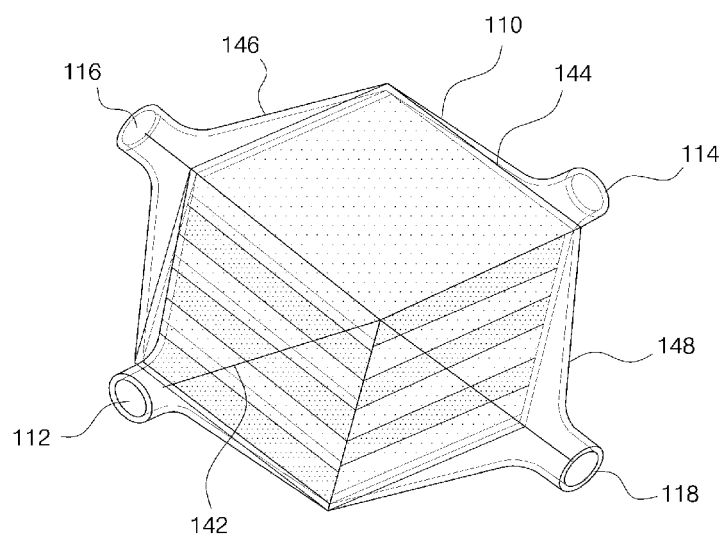
FIG. 9 is a perspective view of a hydrogen reformer according to a sixth embodiment of the present disclosure.
Figure 10:
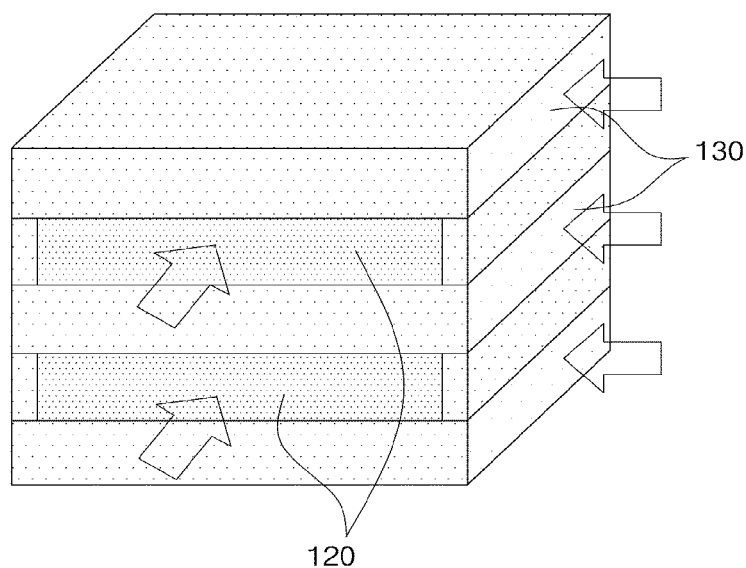
FIG. 10 is a perspective view of the hydrogen reformer according to the sixth embodiment of the present disclosure, in which catalytic reaction units and heat exchange units are alternately stacked on each other.

As shown in FIGS. 9 and 10, a hydrogen reformer according to a sixth embodiment, includes: catalytic reaction units 120 laminated in plural; heat exchange units 130 stacked alternately with the catalyst reaction units 120 and arranged to be orthogonal to the catalyst reaction units 120 to provide heat to the catalyst reaction units 120; and a housing 110 in which the catalyst reaction units 120 and the heat exchange units 130 are housed.

The housing 110 includes: an inlet 112 for supplying a mixed gas in which exhaust gas and fuel are mixed to the catalytic reaction units 120; and an outlet 114 for discharging a reformed gas containing hydrogen produced by reacting with a metal catalyst carrier while passing through the catalytic reaction units 120, in which the inlet 112 and the outlet 114 are formed at the inlet side and the outlet side of the catalytic reaction units, respectively.

At the front and rear surfaces of the housing 110, in which the inlet 112 and the outlet 114 of the housing 110 are formed, a first distribution space 142 and a second distribution space 144 are formed such that the mixed gas sucked into the inlet 112 is uniformly supplied to the plurality of catalytic reaction units 120 and the reformed gas discharged from the catalytic reaction units 120 is smoothly discharged via the outlet 114.

The housing 110 is provided with an exhaust gas supply portion 116 for supplying exhaust gas to the heat exchange units 130 and an exhaust gas discharge portion 118 for discharging exhaust gas of which heat is completely exchanged through the heat exchange units 130, respectively, in which the exhaust gas supply portion 116 and the exhaust gas discharge portion 118 are disposed orthogonally with the inlet 112 and the outlet 114, respectively.

At both side surfaces of the housing 110, in which the inlet 112 exhaust gas supply portion 116 and the exhaust gas discharge portion 118 of the housing 110 are formed, a third distribution space 146 and a fourth distribution space 148 are formed such that the exhaust gas is uniformly supplied to the plurality of heat exchange units 130 and the exhaust gas having passed through the heat exchange units 130 is smoothly discharged via the exhaust gas discharge portion 118.

The catalyst reaction units 120 are the same as the catalyst reaction unit described in the first embodiment, in view of the structure, and the heat exchange units 130 may be formed in a shape having a plurality of passages that are the same as those of the honeycomb member or the catalytic reaction unit described in the third embodiment.

The hydrogen reformer according to the sixth embodiment reacts with the metal catalyst carrier while a mixed gas in which exhaust gas and fuel are mixed passes through a plurality of catalytic reaction units 120 to produce a reformed gas containing hydrogen, and the produced reformed gas is supplied to a fuel supply line to be mixed with the fuel such that the mixed gas of the reformed gas the fuel is supplied to a combustion chamber of the engine.

When the exhaust gas is supplied to the heat exchange units 130 and passes through the heat exchange units 130, heat is exchanged between the exhaust gas and the catalytic reaction units 120 to supply, to the catalytic reaction units 120, heat required for the endothermic reaction of the catalytic reaction units 120.

As described above, the catalytic reaction units 120 and the heat exchange units 130 are arranged alternately and orthogonally, to each other, so that the heat exchanging performance can be improved.

While the present disclosure has been particularly shown and described with reference to exemplary embodiments thereof, by way of illustration and example only, it is clearly understood that the present disclosure is not to be construed as limiting the present disclosure, and various changes and modifications may be made by those skilled in the art within the protective scope of the invention without departing off the spirit of the present disclosure.

INDUSTRIAL APPLICABILITY

A hydrogen reformer is provided in an engine using fossil fuel to provide a mixed gas containing hydrogen in the fossil fuel, thereby improving the thermal efficiency of the engine and reducing the exhaust gas.

What is claimed is:

1. A hydrogen reformer using exhaust gas, the hydrogen reformer comprising:
an engine;
an exhaust pipe connected to the engine and configured to discharge an exhaust gas generated in the engine;
a fuel supply line connected to the engine and configured to supply a fuel to the engine;
a catalytic reaction unit for producing a reformed gas containing hydrogen, the catalytic reaction unit being connected with the engine and configured to receive a first portion of the exhaust gas through a first line connected to the exhaust pipe and an atomized fuel through a second line,
wherein the catalyst reaction unit comprises: a housing including an inlet to receive a mixed gas of the first portion of the exhaust gas and the atomized fuel and an outlet to discharge the reformed gas containing hydrogen through a third line connected to the fuel supply line and a metal catalyst carrier mounted inside the housing to react the first portion of the exhaust gas and the atomized fuel through an endothermic reaction and produce the reformed gas containing hydrogen;
a heat exchange chamber mounted around an outer surface of the catalytic reaction unit, the heat exchange chamber being connected with the engine through a fourth line connected to the exhaust pipe and configured to receive a second portion of the exhaust gas and configured to provide heat necessary for the endothermic reaction of the catalytic reaction unit by using heat of the second portion of the exhaust gas and be discharged through a fifth line; and
a heat exchange unit disposed inside the heat exchange chamber, the heat exchange unit being configured to increase a heat exchanging efficiency between the second portion of exhaust gas and the catalytic reaction unit, wherein the heat exchange unit is formed of a heat exchange plate wound on the outer surface of the housing at certain intervals to thus partition a space of the heat exchange chamber into a plurality of spaces and allow the second portion of exhaust gas to flow along the outer surface of the housing at each of the plurality of spaces.

2. The hydrogen reformer using exhaust gas of claim 1, wherein the metal catalyst carrier comprises a passage through which the mixed gas of the first portion of the exhaust gas and the atomized fuel, and the passage is formed of flat plates and corrugated plates which are alternately arranged, and
wherein a catalytic material is coated on surfaces of the flat plates and the corrugated plates.

3. The hydrogen reformer using exhaust gas of claim 1, wherein a gas inlet port through which the second portion of the exhaust gas flow is formed at one side of the heat exchange chamber, and a gas outlet port through which the second portion of the exhaust gas is discharged is formed at the other side thereof.

* * * * *